United States Patent
Lim et al.

(10) Patent No.: US 8,337,102 B2
(45) Date of Patent: Dec. 25, 2012

(54) SHUTTER DEVICE FOR CAMERA

(75) Inventors: Dae-Soon Lim, Yongin-Si (KR);
Kyung-Ho Kim, Hwaseong-Si (KR);
Jin-Chul Ahn, Gyeonggi-do (KR);
Tae-Jin Kim, Gyeonggi-do (KR);
Ho-Young Jung, Songpa-gu (KR)

(73) Assignee: Sung Woo Electronics Co., Ltd., Seoul (KR)

( * ) Notice: Subject to any disclaimer, the term of this patent is extended or adjusted under 35 U.S.C. 154(b) by 43 days.

(21) Appl. No.: 12/988,212

(22) PCT Filed: Dec. 16, 2008

(86) PCT No.: PCT/KR2008/007428
§ 371 (c)(1),
(2), (4) Date: Oct. 15, 2010

(87) PCT Pub. No.: WO2009/128600

PCT Pub. Date: Oct. 22, 2009

(65) Prior Publication Data

US 2011/0038626 A1    Feb. 17, 2011

(30) Foreign Application Priority Data

Apr. 17, 2008  (KR) .................. 10-2008-0035704
Jun. 19, 2008  (KR) .................. 10-2008-0057698

(51) Int. Cl.
*G03B 9/08*  (2006.01)

(52) U.S. Cl. ...................................... 396/468

(58) Field of Classification Search .................. 396/468, 396/439, 463
See application file for complete search history.

(56) References Cited

U.S. PATENT DOCUMENTS

| | | | | |
|---|---|---|---|---|
| 6,331,741 B1 * | 12/2001 | Suzuki | ........................ | 310/49.11 |
| 6,796,729 B2 * | 9/2004 | Mizukami et al. | ............ | 396/497 |
| 7,670,069 B2 * | 3/2010 | Suzuki et al. | ................. | 396/463 |
| 2004/0062542 A1 * | 4/2004 | Watanabe | ...................... | 396/463 |
| 2005/0286889 A1 * | 12/2005 | Kihara | ........................ | 396/463 |
| 2007/0172231 A1 * | 7/2007 | Durfee | ........................ | 396/463 |
| 2007/0201866 A1 * | 8/2007 | Kihara | ........................ | 396/468 |
| 2008/0240707 A1 * | 10/2008 | Yasuda et al. | ................. | 396/463 |

FOREIGN PATENT DOCUMENTS

| | | |
|---|---|---|
| JP | 2001142110 A | 5/2001 |
| JP | 2001174867 A | 6/2001 |
| JP | 2002099023 A | 4/2002 |

* cited by examiner

*Primary Examiner* — Clayton E Laballe
*Assistant Examiner* — Warren Fenwick
(74) *Attorney, Agent, or Firm* — Blank Rome LLP

(57) ABSTRACT

The present invention relates to a shutter device for camera used for small-sized digital equipment and includes a base forming a light transmission hole to expose a film or charge-coupled device (CCD) to laser beam; an electromagnet mounted on one side of the base; a driving arm which is mounted on one side of the electromagnet on the base so as to pivot on the base; a first shutter and a second shutter to open and close the light transmission hole, which pivots on the part of the base in association with the pivoting of the driving arm; and a magnetic which is installed on the driving arm and has the north magnetic pole and the south magnetic pole at opposite ends of the magnetic or on surfaces opposite to the electromagnet. The driving arm drives the first shutter and the second shutter by pivoting in a clockwise or counter-clockwise direction by the attractive force and repulsive force generated between the electromagnet and the magnetic according to the direction of the electric current applied to the electromagnet, the electromagnet includes a bobbin and a coil wound around the bobbin, and each side of the bobbin having opposite poles of magnetic field is disposed adjacent to the north and south pole.

13 Claims, 8 Drawing Sheets

SHUTTER DEVICE FOR CAMERA

TECHNICAL FIELD

The present invention relates to a shutter device, and more particularly, to a shutter device for a camera used for a small-sized digital equipment.

BACKGROUND ART

With the development of digital technology, portable digital equipments such as a mobile communication terminal, a portable game console, a personal digital assistant (PDA), a personal multimedia player (PMP), and a digital camcorder are being launched as a product combining a camera function.

A camera unit installed in such a portable small-sized digital equipment includes a shutter device to control the amount of light to obtain a necessary exposure like a general camera. In particular, if the camera is embedded in a mobile communication terminal, for example, in a mobile phone, it is essential to employ a mechanical shutter to photograph with high quality. It is also important to simplify the structure of the shutter device since a slim mobile phone requires a small-sized and slim camera module. Also, the camera unit is required to operate the shutter device at high speed to obtain photos of good quality.

In a conventional camera shutter device used for a portable small-sized digital equipment, however, a driving source to apply a predetermined driving force to the shutter, for example, an actuator has a relatively big size to guarantee high operating speed of the shutter. Therefore, there is a problem that the whole size of a lens unit, as well as the size of the shutter device, increases. This problem eventually results in increase in the whole size of the portable small-sized digital equipment and deteriorates portability of the digital device.

DISCLOSURE OF INVENTION

Technical Problem

In order to solve the above problem, the present invention provides a shutter device for a camera employed in a small-sized digital equipment, which has a micro mini size but is capable of maintaining driving performance of the shutter.

Technical Solution

The above object is achieved by providing a shutter device for a camera, comprising: a base which forms a light transmission hole to allow light to pass therethrough to expose a film or a charge-coupled device (CCD) to the light; an electromagnet which is mounted on one side of the base; a driving arm which is located on one side of the electromagnet on the base and is pivotably disposed on the base; a first shutter and a second shutter which pivot about a part of the base simultaneously in association with pivotal movement of the driving arm, for opening and closing the light transmission hole; and a magnet which is disposed on the driving arm and has a N pole and a S pole magnetized at opposite ends or a surface opposite to the electromagnet, The driving arm operates the first and the second shutters, while pivoting in a clockwise direction and in a counter clockwise direction due to attractive force and repulsive force which are created between the electromagnet and the magnet according to a direction of current applied to the electromagnet, and the electromagnet comprises a bobbin and a coil wound around the bobbin, and the bobbin has opposite ends where magnetic fields of different poles are generated simultaneously and which are located adjacent to the N pole and the S pole of the magnet.

The bobbin may be formed in a shape of a cut-off loop and the opposite ends may be arranged parallel to each other with a space therebetween in a pivotal direction of the driving arm.

When the first and the second shutters are closed, the N pole and the S pole of the magnet may be located adjacent to the opposite ends of the bobbin, and when the first and the second shutters are opened, one of the N pole and the S pole of the magnet may be located adjacent to one of the opposite ends of the bobbin.

One of the opposite ends of the bobbin may be bent in the opposite direction to the other one such that a gap between the opposite ends of the bobbin is set. Also, the opposite ends of the bobbin may be bent in the same direction.

The bobbin may stand up in a shape of a cut-off loop and the opposite ends may face each other apart from each other. When the first and the second shutters are opened, the N pole and the S pole of the magnet may be located adjacent to the opposite ends of the bobbin, and the bobbin may be bent such that the facing opposite ends are misaligned from each other.

The above object is also achieved by providing a shutter device for camera comprising: a base which forms a light transmission hole to allow light to pass therethrough to expose a film or a charge-coupled device (CCD) to the light; an electromagnet which is mounted on one side of the base; a driving arm which is located on one side of the electromagnet on the base and is pivotably disposed on the base; a first shutter and a second shutter which pivot about a part of the base simultaneously in association with pivotal movement of the driving arm, for opening and closing the light transmission hole; and a magnet which is disposed on the driving arm and has a N pole or a S pole on a surface opposite to the electromagnet. The driving arm operates the first and the second shutter, while pivoting in a clockwise direction and in a counter clockwise direction due to attractive force and repulsive force which are created between the electromagnet and the magnet according to a direction of current applied to the electromagnet, and the electromagnet comprises a bobbin and a coil wound around the bobbin, and the bobbin has opposite ends where magnetic fields of different poles are generated simultaneously and which are located adjacent to the surface of the magnet opposite to the electromagnet.

The surface of the magnet opposite to the electromagnet may have a rounded surface corresponding to a rotational trajectory of the driving arm so as to maintain a constant distance with respect to the opposite ends of the bobbin.

Advantageous Effects

According to the present invention, a shutter device for camera operates a first shutter and a second shutter at high speed through a micro mini driver and a driving arm so that a camera module employed in a small-sized digital equipment can obtain a vivid photo of high definition.

Moreover, it is possible to maintain the shutter device in a compact size by employing only a single electromagnet and a single magnet.

BEST MODE FOR CARRYING OUT THE INVENTION

Hereinafter, a shutter device for a camera according to a first exemplary embodiment of the present invention will be described with reference to accompanying drawings.

Figure 1:
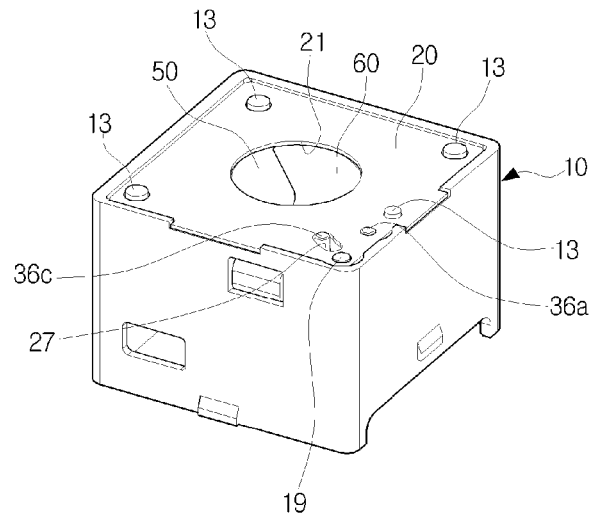
FIGS. 1 and 2 are a perspective view and an exploded perspective view illustrating a shutter device for a camera according to a first exemplary embodiment of the present invention.
Figure 2:
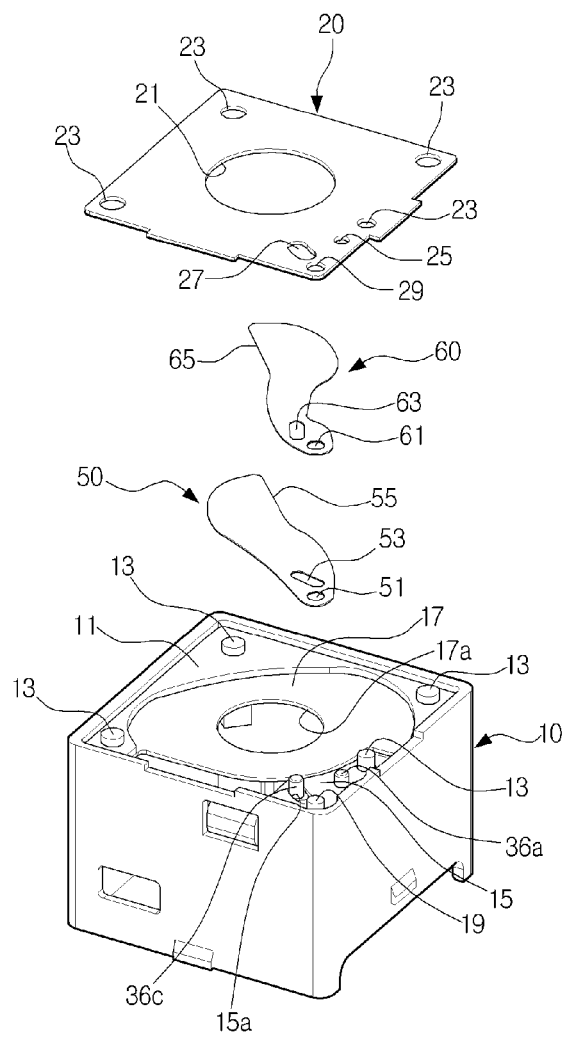
Figure 3:
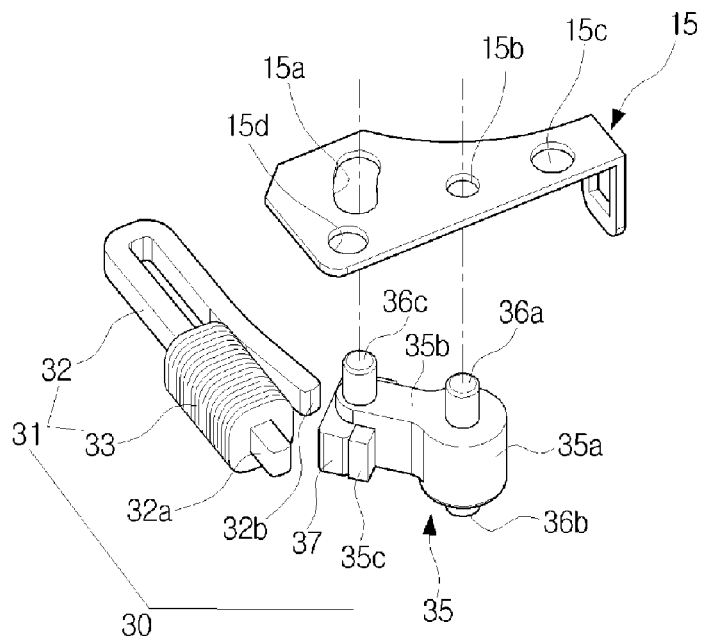
FIG. 3 is a perspective view illustrating a driving part of the shutter device for the camera according to the first exemplary embodiment of the present invention.

Referring to FIGS. 1 to 3, the shutter device according to the first exemplary embodiment of the present invention comprises a base 10, a driving part 30, and a first shutter and a second shutter 50, 60.

The base 10 is formed in a substantially rectangular parallelepiped shape to allow a lens module (not shown) to be seated therein, and has an extension part 11 formed on the upper portion of the base 10 along three inner corners. The extension part 11 is provided with a plurality of fixing protrusions 13 to fix a cover 20. Also, a fixing bracket 15 is disposed on the remaining corner of the base 10 to fix the driving part 30. Moreover, a predetermined circuit such as a printed circuit board (PCB) (not shown) is disposed inside the base 10 to apply current to a coil 33 of the driving part 30.

The fixing bracket 15 is provided with a first guide long hole 15a to slidably guide a connection protrusion 36c of a driving arm 35, and the first guide long hole 15a has a curvature corresponding to a rotation trajectory of the driving arm 35. Also, the fixing bracket 15 comprises a first hole 15b into which a first hinge protrusion 36a of the driving arm 35 is rotatably inserted, and second and third holes 15c, 15d into which one of the fixing protrusions 13 of the base 10 and a shaft protrusion 19, which will be described below, are respectively inserted.

Also, the base 10 comprises a plate 17 and the shaft protrusion 19. The plate 17 closes the upper portion of the base 10 with its circumference part being fixed to the bottom surface of the extension part 11 of the base 10. Also, the plate 17 has a light transmission hole 17a formed where a lens (not shown) of the lens module is located in the base 10. Also, the shaft protrusion 19 is formed on one corner of the base 10 adjacent to the fixing bracket 15. The shaft protrusion 19 serves as a shaft about which the first and the second shutters pivot.

The cover 20 comprises a light transmission hole 21 formed coaxially with the light transmission hole 17a of the plate 17. The light transmission hole 21 has a diameter at least larger than or equal to that of the light transmission hole 17a of the plate 17. Also, the cover 20 is provided with a plurality of connection holes 23 into which the plurality of fixing protrusions 13 of the base 10 are inserted. The cover 20 is also provided with a second guide long hole 27 corresponding to the first guide long hole 15a of the fixing bracket 15 to allow the connection protrusion 36c of the driving arm 35 to be slidably inserted thereinto like the first guide long hole 15a. Moreover, the cover 20 is provided with penetrating holes 25, 29 into which the first hinge protrusion 36a of the driving arm 25 and the shaft protrusion 19 of the base 10 are rotatably inserted, respectively.

The driving part 30 comprises an electromagnet 31, the driving arm 35, and a magnet 37.

The electromagnet 31 comprises a bobbin 32 and a coil 33. The bobbin 32 is formed in the shape of a loop from which a part is cut-off, for example, in a substantially C-shape or U-shape, and has one end 32a and the other end 32b which are arranged substantially parallel to each other. The bobbin 32 is fixed to an inner circumference of the base 10 such that the opposite ends 32a, 32b are located adjacent to the magnet 37.

Figure 8:
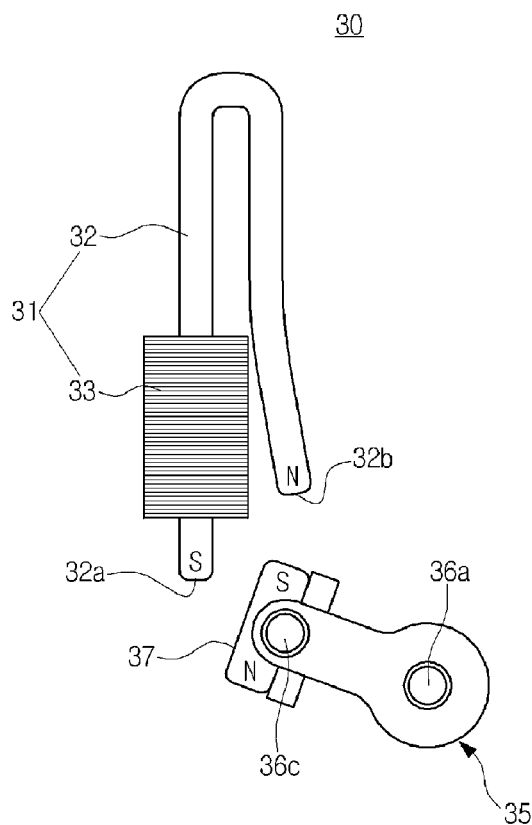
FIGS. 8 and 9 are plane views illustrating the driving part when the first and the second shutters of the shutter device for the camera open the light transmission hole according to the first exemplary embodiment of the present invention.

In this case, different magnetic poles are generated at the opposite ends 32a, 32b of the bobbin 32 and the gap and the length between the opposite ends 32a, 32b may be set by taking into account the length and the rotation angle of the magnet 37. In this embodiment, the gap between the opposite ends 32a, 32b are set by bending the other end 32b by a predetermined angle in the direction opposite to the one end 32a as shown in FIG. 3. Of course, it is possible to bend the opposite ends 32a, 32b of the bobbin 32 by the same angle as shown in FIG. 8. The rotation angle of the driving arm 35 may be appropriately controlled or the distances between the opposite ends 32a, 32b of the bobbin 32 and the N and S poles of the magnet 37 may be set to be distinct from each other such that the driving arm 35 does not stop pivoting due to the attractive force which is exerted between the opposite ends 32a, 32b of the bobbin 32 and the N and S poles of the magnet 37 before pivoting the driving arm 35 or during the pivoting operation.

As described above, the opposite ends 32a, 32b of the bobbin 32 are located respectively adjacent to the opposite ends of the magnet 37 such that, if different magnetic poles are generated at the opposite ends 32a, 32b by the current applied to the electromagnet 30, a magnetic field is formed in a loop shape. Accordingly, unlike a distributed magnetic field, outflow and interference are less generated, thereby preventing the magnetic force from being diminished.

The coil 33 is wound around one side of the bobbin 32 and applies current transmitted from the PCB (not shown) to the bobbin 32 in a forward or a reverse direction such that magnetic fields of different S and N poles are generated at the opposite ends 32a, 32b of the bobbin 32.

The driving arm 35 comprises a cylindrical part 35a and an arm part 35b which extends from one side of the cylindrical part 35a perpendicularly to the axial direction of the cylindrical part 35a.

The cylindrical part 35a comprises a first hinge protrusion 36a and a second hinge protrusion 36b which are concentrically located one on the other along the axis of the cylindrical part 35a. The first hinge protrusion 36a is rotatably connected with the fixing bracket 15 and the second hinge protrusion 36b is rotatably connected with a part of the base 10. Also, the cylindrical part 35a is provided with a support 35c formed under the arm part 35b to fix the magnet 37.

The arm part 35b has the connection protrusion 36c protruding from the upper surface thereof in the same direction as the first hinge protrusion 36a. The connection protrusion 36c is slidably inserted into the first and the second long holes 53, 63 of the first and the second shutters 50, 60. In this case, the distance between the first hinge protrusion 36a and the connection protrusion 36c is set by taking into account the angle by which the first and the second shutters 50, 60 completely open and close the light transmission hole 17a.

The magnet 37 is a bar magnet which has different magnetic poles at opposite ends or on surfaces opposite to the bobbin 32. The opposite ends of the magnet 37 adjacent to the opposite ends 32a, 32b of the bobbin 32 or surfaces of the magnet 37 opposite to the bobbin 32 are magnetized with the N pole and the S pole.

The first shutter 50 comprises a first fixing hole 51, a first long hole 53, and a first close contact part 55. The shaft protrusion 19 about which the first shutter 50 pivots is hingedly inserted into the first fixing hole 51, and the connection protrusion 36c is slidably inserted into the first long hole 53 such that the first shutter 50 pivots in the same direction as the driving arm 35 pivots. In this case, the first long hole 53 is formed on a part of the first shutter 50 adjacent to the first fixing hole 51.

The second shutter 60 is located opposite to the first shutter 50 and comprises a second fixing hole 61, a second long hole 63, and a second close contact part 65. In this case, the shaft protrusion 19 inserted into the first fixing hole 51 is hingedly inserted into the second fixing hole 61, and the connection protrusion 36c of the driving arm 35 inserted into the first long hole 53 is slidably inserted into the second long hole 63. The second long hole 63 is formed on a part of the second shutter 60 adjacent to the second fixing hole 61.

The first and the second close contact parts 55, 65 close-contact with each other when closing the light transmission hole 17a and are distanced away from each other and apart from the light transmission hole 17a when opening the light transmission hole 17a. In this embodiment, the first and the second close contact parts 55, 65 are formed straightly, but this should not be considered as limiting. The first and the second close contact parts 55, 65 may adopt a recess formation having a diameter larger than or equal to that of the light transmission hole 17a to completely open the light transmission hole 17a when the first and the second close contact parts 55, 65 coincide with the circumference of the light transmission hole 17a. The first and the second shutters 50, 60 control the lengths of the first and the second long holes 53, 63 to restrict their pivoting angles until the first and the second close contact parts 55, 65 coincide with the circumference of the light transmission hole 17a.

Figure 4:
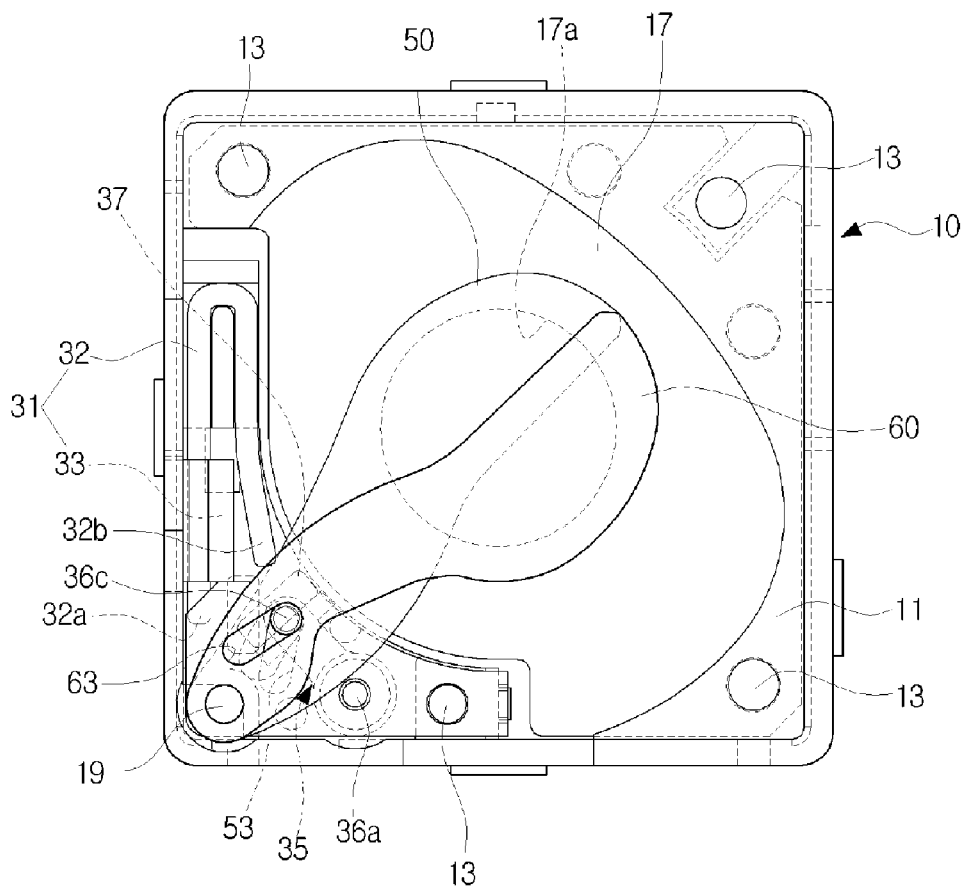
FIG. 4 is a plane view illustrating a first shutter and a second shutter of the shutter device for the camera which close a light transmission hole according to the first exemplary embodiment of the present invention.
Figure 5:
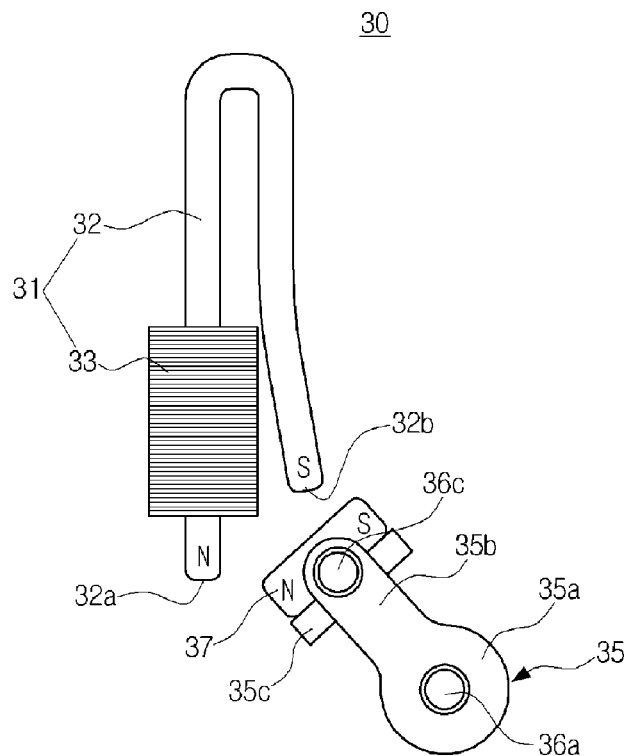
FIGS. 5 and 6 are plane views illustrating the driving part when the first and the second shutters of the shutter device for the camera close the light transmission hole according to the first exemplary embodiment of the present invention.
Figure 6:
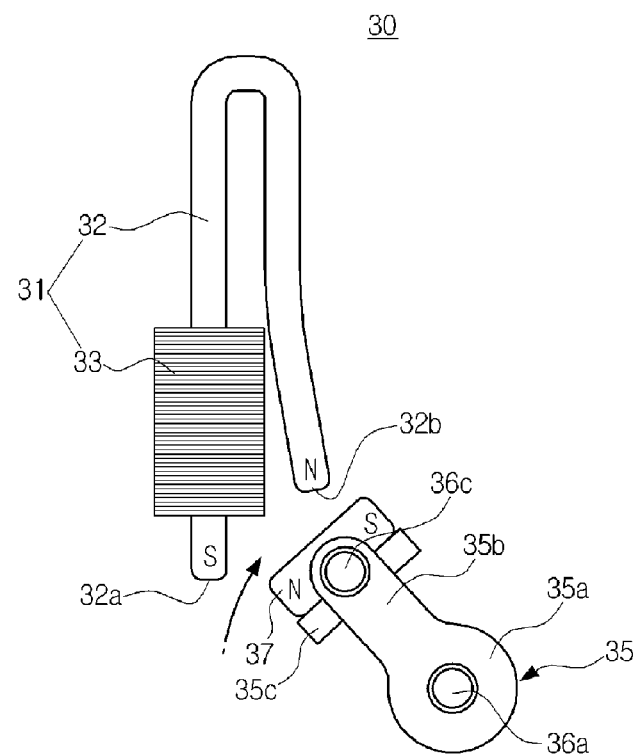
Figure 7:
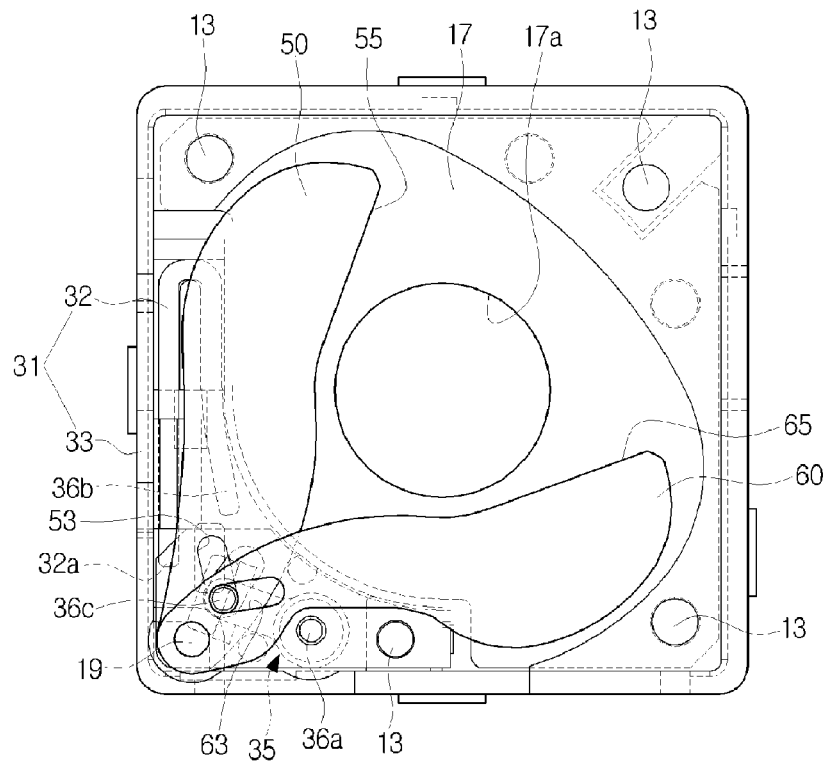
FIG. 7 is a plane view illustrating the first and the second shutters of the shutter device for the camera which open the light transmission hole according to the first exemplary embodiment of the present invention.

Hereinafter, the operation of the shutter device according to the first exemplary embodiment of the present invention will be described with reference to FIGS. 4 to 7. Referring to FIGS. 4 and 7, the cover 20 is omitted for the purpose of explaining the first and the second shutters 50, 60 precisely.

Referring to FIG. 4, if a camera (not shown) is turned on or if a mobile phone (not shown) having a camera embedded therein is set to be a shooting mode, the shutter device for the camera according to the first exemplary embodiment of the present invention is in an initial state where the light transmission hole 17a is completely closed by the first and the second shutters 50, 60 not to expose a film or a charge-coupled device (CCD) to light.

In this state, at the moment a shutter button (not shown) is pressed to take a picture, the first and the second shutters 50, 60 pivot to open the light transmission hole 17a as shown in FIG. 7. Hereinafter, conversion from the state where the light transmission hole 17a is closed (see FIG. 4) to the state where the light transmission hole 17a is opened (see FIG. 7) will be described in detail.

Figure 9:
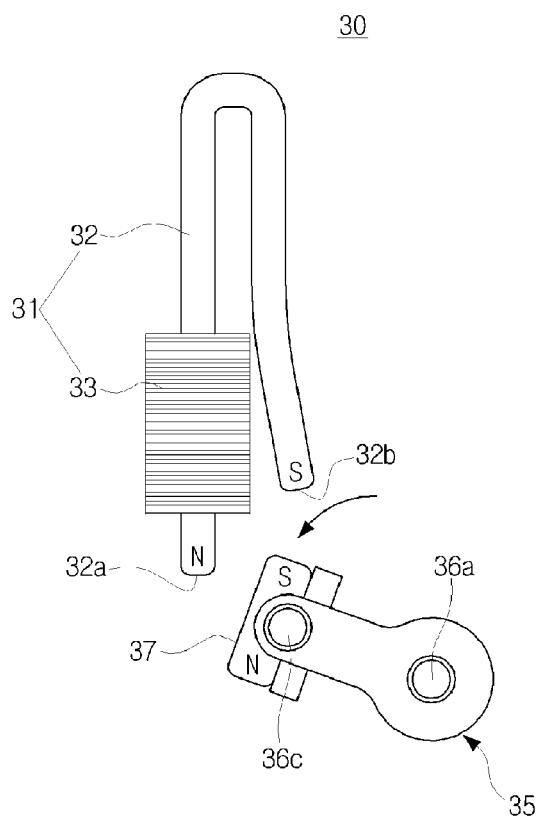
Figure 10:
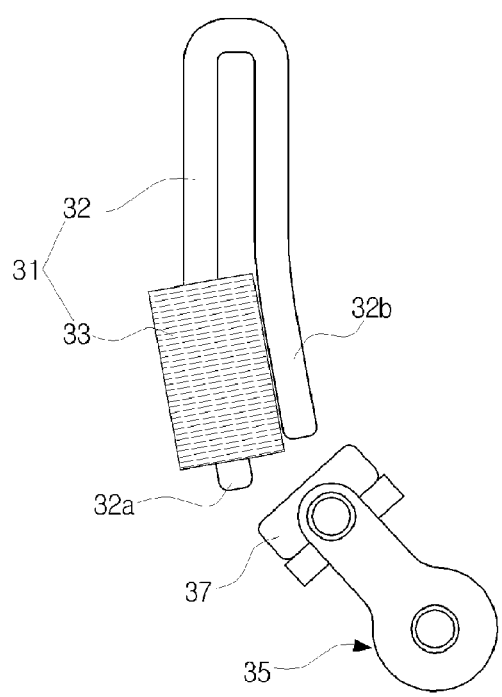
FIG. 10 is a plane view illustrating another example of the bobbin of FIG. 3.

As shown in FIG. 4, when the light transmission hole 17a is closed by the first and the second shutter 50, 60, current is applied to the coil 33 of the electromagnet 31 in a forward direction, thereby generating the magnetic field of the N pole at one end 32a of the bobbin 32 and the magnetic field of the S pole at the other end 32b of the bobbin 32, simultaneously. Accordingly, repulsive force is exerted between the N pole of the magnet 37 and the one end 32a of the bobbin 32 and between the S pole of the magnet 37 and the other end 32b of the bobbin 32. The driving arm 35 pivots about the first and the second hinge protrusions 36a, 36b in a counter clockwise direction by a predetermined angle as shown in FIG. 9. Consecutively, the repulsive force is exerted between the N pole of the magnet 37 and the one end 32a of the bobbin 32 as the N pole of the magnet 37 passes by the one end 32a of the bobbin 32 by the pivotal force of the driving arm 35, and promotes the counter clockwise direction pivotal movement of the driving arm 35. If the S pole of the magnet 37 approaches the one end 32a of the bobbin 32 subsequent to the counter clockwise direction pivotal movement of the driving arm 35, the attractive force is exerted between the S pole of the magnet 37 and the one end 32a of the bobbin 32, thereby further pivoting the driving arm 35 in the counter clockwise direction to the maximum rotation angle.

As the driving arm 35 pivots in the counter clockwise direction as described above, the connection protrusion 36c of the driving arm 35 slides along the first and the second long holes 53, 63 of the first and the second shutter 50,60. Then, as shown in FIG. 7, the first shutter 50 pivots about the shaft protrusion 19 in the counter clockwise direction and simultaneously the second shutter 60 pivots about the shaft protrusion 19 in the clockwise direction such that the first and the second close contact parts 55, 65 are distanced away from each other and located outside the circumference of the light transmission hole 17a, thereby opening the light transmission hole 17a.

A process of the first and the second shutters 50, 60 closing the light transmission hole 17a by the driving part 30 will be described below.

If current is applied to the coil 33 of the electromagnet 31 in the reverse direction to that when the light transmission hole 17a is opened, the magnetic field of the S pole is generated at the one end 32a of the bobbin 32 and simultaneously the magnetic field of the N pole is generated at the other end 32b as shown in FIG. 8. Accordingly, due to the repulsive force exerted between the S pole of the magnet 37 and the one end 32a of the bobbin 32, the driving arm 35 pivot about the first and the second hinge protrusions 36a, 36b in a clockwise direction as shown in FIG. 6. If the N pole of the magnet 37 approaches the one end 32a of the bobbin 32 and the S pole of the magnet 37 approaches the other end 32b of the bobbin 32 due to the continuous clockwise pivotal movement of the driving arm 35, the attractive force is exerted between the N pole of the magnet 37 and the one end 32a of the bobbin 32 and also the attractive force is exerted between the S pole of the magnet 37 and the other end 32b of the bobbin 32 such that the driving arm 35 further pivots in the clockwise direction to the maximum rotation angle.

As the driving arm 35 pivots in the clockwise direction as described above, the connection protrusion 36c of the driving arm 35 slides along the first and the second long holes 53, 63 of the first and the second shutters 50, 60, and accordingly, the first shutter 50 pivots about the shaft protrusion 19 in the clockwise direction and simultaneously the second shutter 60 pivots about the shaft protrusion 19 in the counter clockwise direction, thereby closing the light transmission hole 17a.

The shutter device for the camera according to the first exemplary embodiment of the present invention is capable of operating the driving arm 35 at high speed through the micro mini driving part 30 by consecutively converting the N pole and the S pole at the opposite ends 32a, 32b of the bobbin 32, which are located adjacent to the N pole and the S pole of the opposite ends of a single magnet 37 or of surfaces opposite to the bobbin 32, and thus alternately generating the attractive force and the repulsive force at the N pole and the S pole of the magnet 37.

A shutter device for the camera according to a second exemplary embodiment of the present invention has the same constitution as that of the first exemplary embodiment except for a driving part 130. Therefore, only the driving part 130 will be described below with reference to FIGS. 11 to 13.

The driving part 130 comprises an electromagnet 131, a driving arm 135, and a magnet 137.

Figure 11:
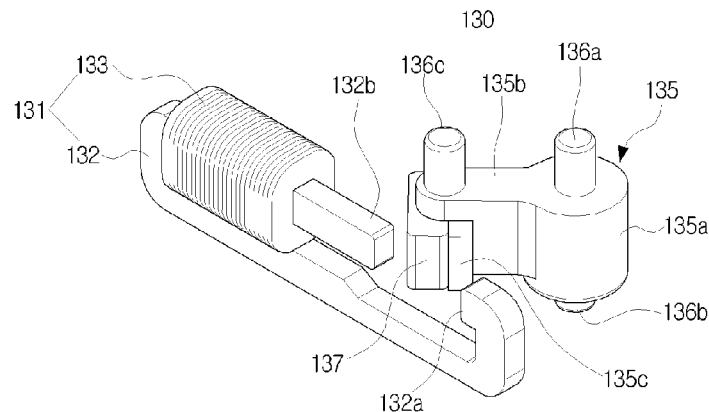
FIG. 11 is a perspective view illustrating a driving part of a shutter device for a camera according to a second exemplary embodiment of the present invention.

The electromagnet 131 comprises a bobbin 132 and a coil 133 as shown in FIG. 11. The bobbin 132 stands up and is formed in the shape of a loop from which a part is cut off, for example, in the substantially C-shape. The opposite ends 132a, 132b of the bobbin 132 face each other and are distanced away from each other by a predetermined gap. The opposite ends 132a, 132b of the bobbin 132 does not face parallel to each other and one of them is bent to be misaligned from other one. This is to impel the first and the second shutters 50 to be opened and closed when the driving arm 135 does not pivot to a predefined angle due to the balance in the force which may be generated between the bobbin 132 and the magnet 137 during the pivoting operation by the conversion of the magnetic pole. For example, as in the first exemplary embodiment, the other end 132b of the bobbin 132 around which the coil 133 is wound may be bent toward the driving arm 135 by a predetermined angle.

In this case, different magnetic poles are simultaneously generated at the opposite ends 132a, 132b of the bobbin 132, and the distance between the opposite ends 132a, 132b are set by taking into account the length and the rotation angle of the magnet 137 as in the first exemplary embodiment.

In the second exemplary embodiment, the opposite ends 132a, 132b of the bobbin 132 are located adjacent to the opposite ends of the magnet 137 or surfaces opposite to the bobbin 132. Therefore, if current is applied to the electromagnet 130 and generates magnetic poles at the opposite ends 132a, 132b, the magnetic field is generated in the shape of a loop, preventing the magnetic force from being diminished due to the outflow of the magnetic field and the interference.

The coil 133 is wound around the other side of the bobbin 132 and applies current received through the PCB (not shown) to the bobbin 132 in a forward or reverse direction, thereby generating magnetic fields of different N and S poles at the opposite ends 132a, 132b of the bobbin 132, simultaneously.

The driving arm 135 has the same constitution as that of the driving arm 35 of the first exemplary embodiment. That is, the driving arm 135 comprises a cylindrical part 135a and an arm part 135b which extends from one side of the cylindrical part 135a perpendicularly to the axial direction of the cylindrical part 135a. The cylindrical part 135a comprises a first hinge protrusion 136a and a second hinge protrusion 136b which are concentrically located one on the other along the axis of the cylindrical part 35a, and the arm part 135b comprises a connection protrusion 136c which protrudes from the upper surface of the arm part 135b in the same direction as that of the first hinge protrusion 36a. The connection protrusion 136c is slidably inserted into the first and the second long holes 53, 63 of the first and the second shutters 50, 60.

Figure 12:
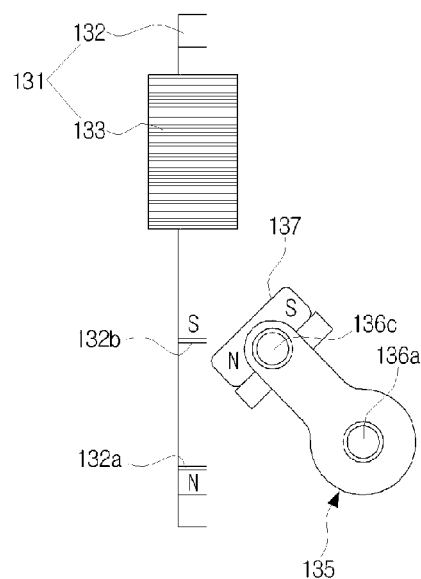
FIGS. 12 and 13 are plane views illustrating the driving part of the shutter device for the camera when it is operated according to the second exemplary embodiment of the present invention.
Figure 13:
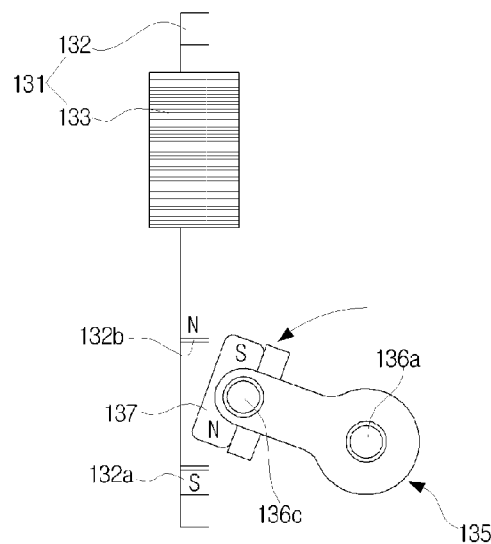

The shutter device constructed above according to the second exemplary embodiment of the present invention is operated through the same process as that of the shutter device of the first exemplary embodiment and thus detailed descriptions thereof will be omitted. For reference, FIG. 12 illustrates the magnet 137 and the driving arm 135 when the first and the second shutters 50, 60 are closed, and FIG. 13 illustrates the magnet 137 and the driving arm 135 when the first and the second shutters 50, 60 are opened.

Figure 14:
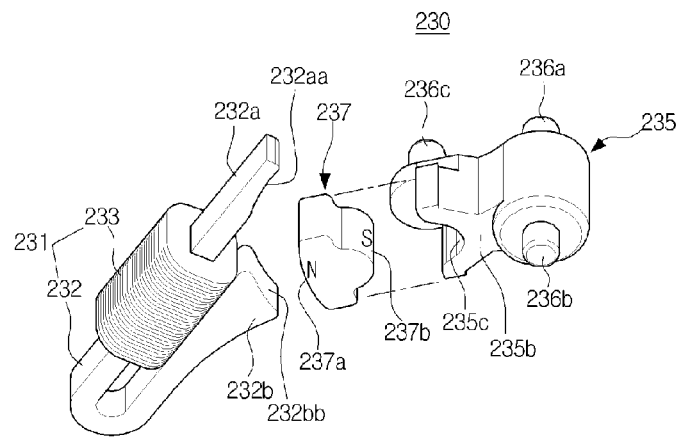
FIG. 14 is a perspective view illustrating a driving part of a shutter device for camera according to a third exemplary embodiment of the present invention.

A shutter device according to a third exemplary embodiment of the present invention has the same constitution as that of the first exemplary embodiment except for a driving part 230. Description of the shutter device will be omitted and only the driving part 230 will be described below with reference to FIG. 14.

The driving part 230 comprises an electromagnet 231, a driving arm 235, and a magnet 237.

The electromagnet 231 comprises a bobbin 232 and a coil 233. The bobbin 232 is formed in the shape of a loop from which a part is cut off, for example, in substantially C-shape or U-shape, and has one end 232a and the other end 232b which are arranged parallel to each other. The bobbin 232a is fixed to an inner circumference of the base 10 such that the opposite ends 232a, 232b are located adjacent to the opposite surface 237a of the magnet 237.

In this case, different magnetic poles are generated at the opposite ends 232a, 232b of the bobbin 232, and the distance and the length between the opposite ends 232a, 232b may be set by taking into account the length and the rotation angle of the magnet 237.

The coil 233 is wound around one side of the bobbin 232 and applies current received through the PCB (not shown) to the bobbin 232 in a forward or reverse direction, thereby generating magnetic fields of different N and S poles at the opposite ends 232a, 232b of the bobbin 232, simultaneously.

The driving arm 235 comprises a cylindrical part 235a and an arm part 235b which extends from one side of the cylindrical part 235a perpendicularly to the axial direction of the cylindrical part 235a.

The cylindrical part 235a comprises a first hinge protrusion 236a and a second hinge protrusion which are concentrically located one on the other along the axis of the cylindrical part 35a. The first hinge protrusion 236a is rotatably connected with the fixing bracket 15 and the second hinge protrusion 236b is rotatably connected with a part of the base 10. Also, the cylindrical part 235a has a fixing recess 235c formed on one side of the arm part 235b to fix the magnet 237.

The arm part 235b comprises a connection protrusion 236c protruding from the upper surface thereof in the same direction as that of the first hinge protrusion 236a. The connection protrusion 236c is slidably inserted into the first and the second long holes 53, 63 of the first and the second shutters 50, 60. In this case, the distance between the first hinge protrusion 236a and the connection protrusion 236c may be determined by taking into account the angle between the first and the second shutters 50, 60 enabling the light transmission hole 17a to be completely opened or closed.

The magnet 237 has the N pole magnetized on a surface 237a opposite to the bobbin and has the S pole magnetized on an insertion surface 237b protruding to be inserted into the fixing recess 235c. The magnetic poles may be magnetized at reverse positions of the magnet 237. Since the surface 237a of the magnet 237 is magnetized with a single magnetic pole, the magnet 237 may be formed with a shorter length compared to the magnets 37, 137 of the first and the second exemplary embodiments so as not to receive interference with the magnetic fields generated at the opposite ends 232a, 232b of the bobbin 232.

Also, the surface 237a of the magnet 237 opposite to the bobbin 232 is rounded to correspond to a rotation trajectory of the driving arm 235 so as to maintain the constant distance with respect to the opposite ends 232a, 232b of the bobbin 232. The surfaces of the opposite ends 232a, 232b of the bobbin 232, opposite to the magnet 237, are rounded to correspond to the rotation trajectory of the driving arm 235.

The shutter device constructed above according to the third exemplary embodiment of the present invention is similar to that of the first exemplary embodiment in its operation, but differs from it in the change of the magnetic field generated between the magnet 237 and the opposite ends of the bobbin. Hereinafter, only the driving part 230 which differs from that of the first exemplary embodiment will be described with reference to FIGS. 15-18.

Figure 15:
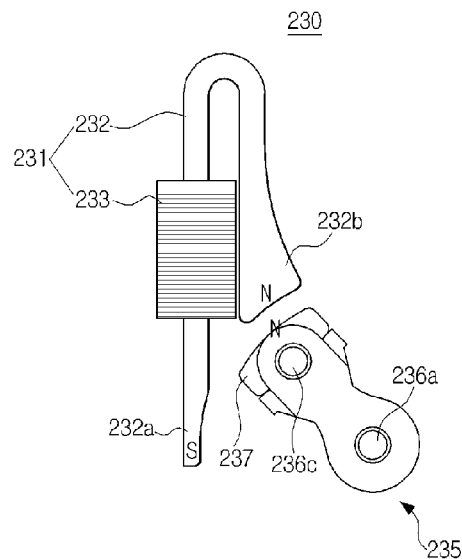
FIGS. 15 and 16 are plane views illustrating the driving part when a first shutter and a second shutter of the shutter device for the camera close a light transmission hole according to the third exemplary embodiment of the present invention.
Figure 18:
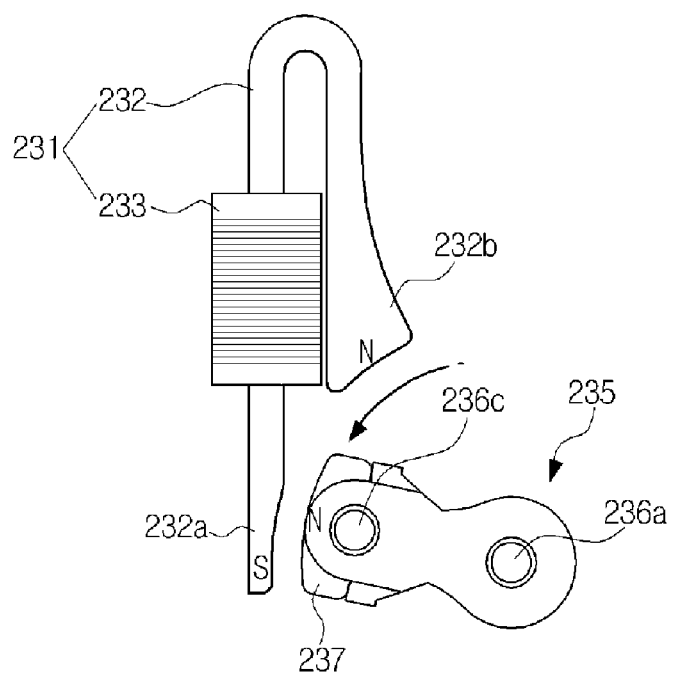

Referring to FIG. 15, if the magnetic field of the S pole is generated at one end 232a of the bobbin 232 and simultaneously the magnetic field of the N pole is generated at the other end 232b of the bobbin 232 by applying current to the coil 233 of the electromagnet 231 in a forward direction when the light transmission hole 17a is closed by the first and the second shutters 50, 60, the repulsive force is exerted between the N pole of the magnet 237 and the other end 232b of the bobbin 232, thereby pivoting the driving arm 235 about the first and the second hinge protrusions 236a, 236b in a counter clockwise direction by a predetermined angle as shown in FIG. 18. Consecutively, if the N pole of the magnet 237 approaches the one end 232a of the bobbin 232 due to the rotational force of the driving arm 235, the attractive force is exerted between the N pole of the magnet 237 and the one end 232a of the bobbin 232, thereby further pivoting the driving arm 235 continuously in the counter clockwise direction to the maximum rotation angle.

As the driving arm 235 pivots in the counter clockwise direction as described above, the first shutter 50 pivots about the shaft protrusion 19 in the counter clockwise direction and simultaneously the second shutter 60 pivots the shaft protrusion 19 in the clockwise direction, thereby opening the light transmission hole 17a.

A process in which the first and the second shutters 50, 60 close the light transmission hole 17a using the driving 30 is as follows.

Figure 16:
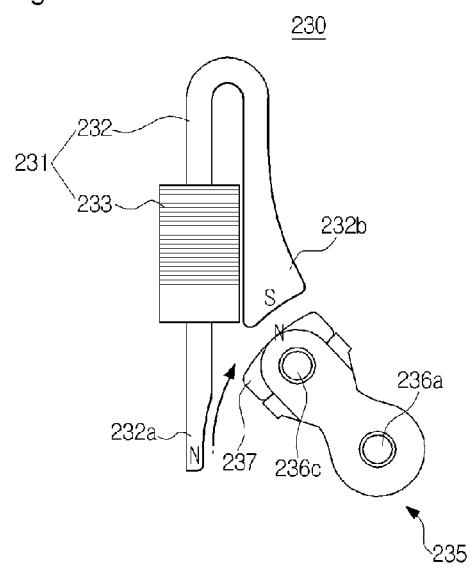
Figure 17:
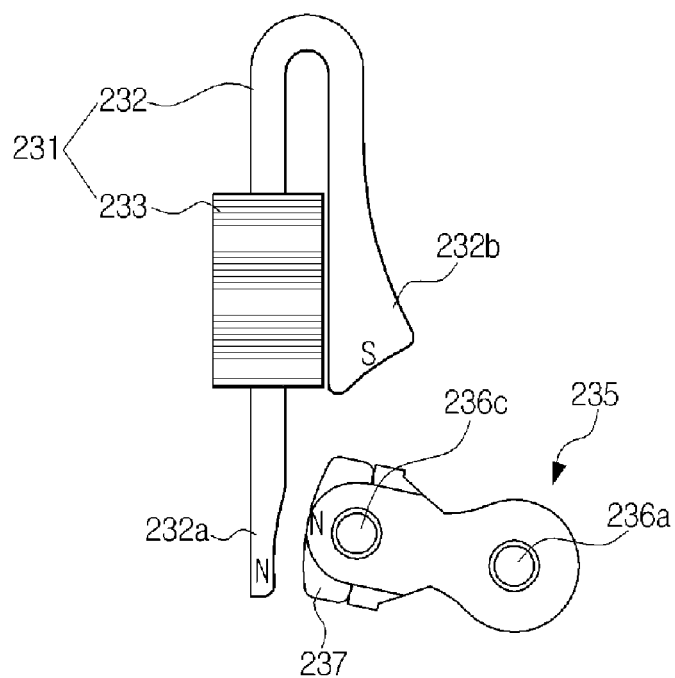
FIGS. 17 and 18 are plane views illustrating the driving part when the first and the second shutters of the shutter device for the camera open the light transmission hole according to the third exemplary embodiment of the present invention.

If current is applied to the coil 233 of the electromagnet 231 in the opposite direction to that of opening the light transmission hole 17a, the magnetic field of the N pole is generated at the one end 232a of the bobbin 232 and simultaneously the magnetic field of the S pole is generated at the other end 232b as shown in FIG. 17. Accordingly, the repulsive force is exerted between the N pole of the magnet 237 and the one end 232a of the bobbin 232, thereby pivoting the driving arm 235 about the first and the second hinge protrusions 236a, 236b in the clockwise direction as shown in FIG. 16. Consecutively, if the N pole of the magnet 237 approaches the other end 232b of the bobbin 232 due to the clockwise pivotal movement of the driving arm 235, the attractive force is exerted between the N pole of the magnet 237 and the other end 232b of the bobbin 232, thereby further pivoting the driving arm 235 continuously in the clockwise direction to the maximum rotation angle.

As the driving arm 235 pivots in the clockwise direction as described above, the first shutter 50 pivots about the shaft protrusion 19 in the clockwise direction and simultaneously the second shutter 60 pivots about the shaft protrusion 19 in the counter clockwise direction, thereby closing the light transmission hole 17a.

INDUSTRIAL APPLICABILITY

The shutter device for camera of the present invention may be mounted on a portable small-sized digital equipment.

The invention claimed is:

1. A shutter device for a camera, comprising:
a base which forms a light transmission hole to allow light to pass therethrough to expose a film or a charge-coupled device (CCD) to the light;
an electromagnet which is mounted on one side of the base;
a driving arm which is located on one side of the electromagnet on the base and the driving arm having one end portion that is pivotably disposed on the base and an opposite free end portion;
a first shutter and a second shutter which pivot about a part of the base simultaneously in association with pivotal movement of the driving arm, for opening and closing the light transmission hole; and
a magnet which is disposed on the opposite free portion of the driving arm and has a N pole and a S pole magnetized at opposite ends on a surface opposite to the electromagnet,
wherein the driving arm operates the first and the second shutters, while pivoting in a clockwise direction and in a counter clockwise direction by a driving force generated such that the magnet moves in a circular arc with respect to a rotation center of the driving arm due to attractive force and repulsive force which are created between the electromagnet and the magnet according to a direction of current applied to the electromagnet,
wherein the electromagnet comprises a bobbin and a coil wound around the bobbin, and the bobbin has opposite ends where magnetic fields of different poles are generated simultaneously and which are located adjacent to the N pole and the S pole of the magnet.

2. The shutter device as claimed in claim 1, wherein the bobbin is formed in a shape of a cut-off loop and the opposite ends are arranged parallel to each other with a space therebetween in a pivotal direction of the driving arm.

3. The shutter device as claimed in claim 2, wherein, in order to open and close the first and the second shutters, according to the pivotal direction of the driving arm, the magnet is shifted from the state where the N pole and the S pole of the magnet are located adjacent to the opposite ends of the bobbin to the state where only one of the N pole and the S pole is located adjacent to one of the opposite ends of the bobbin.

4. The shutter device as claimed in claim 2, wherein one of the opposite ends of the bobbin is bent in the opposite direction to the other one such that a gap between the opposite ends of the bobbin is set.

5. The shutter device as claimed in claim 2, wherein the opposite ends of the bobbin are bent in the same direction.

6. The shutter device as claimed in claim 1, wherein the bobbin stands up in a shape of a cut-off loop and the opposite ends face each other apart from each other.

7. The shutter device as claimed in claim 6, wherein the bobbin is bent such that the facing opposite ends are misaligned from each other.

8. A shutter device for camera comprising:
- a base which forms a light transmission hole to allow light to pass therethrough to expose a film or a charge-coupled device (CCD) to the light;
- an electromagnet which is mounted on one side of the base;
- a driving arm which is located on one side of the electromagnet on the base and the driving arm having one end portion that is pivotably disposed on the base and an opposite free end portion;
- a first shutter and a second shutter which pivot about a part of the base simultaneously in association with pivotal movement of the driving arm, for opening and closing the light transmission hole; and
- a magnet which is disposed on the opposite free end portion of the driving arm and has a N pole or a S pole on a surface opposite to the electromagnet,
- wherein the driving arm operates the first and the second shutter, while pivoting in a clockwise direction and in a counter clockwise direction by a driving force generated such that the magnet moves in a circular arc with respect to a rotation center of the driving arm due to attractive force and repulsive force which are created between the electromagnet and the magnet according to a direction of current applied to the electromagnet,
- wherein the electromagnet comprises a bobbin and a coil wound around the bobbin, and the bobbin has opposite ends where magnetic fields of different poles are generated simultaneously and which are located adjacent to the surface of the magnet opposite to the electromagnet.

9. The shutter device as claimed in claim 8, wherein the surface of the magnet opposite to the electromagnet has a rounded surface corresponding to a rotational trajectory of the driving arm so as to maintain a constant distance with respect to the opposite ends of the bobbin.

10. The shutter device as claimed in claim 8, wherein the bobbin is formed in a shape of a cut-off loop and the opposite ends are arranged parallel to each other with a space therebetween in a pivotal direction of the driving arm.

11. The shutter device as claimed in claim 9, wherein the magnet has an insertion surface which protrudes opposite to the surface of the magnet opposite to the electromagnet and which is inserted into a fixing recess of the driving arm.

12. The shutter device as claimed in claim 9 or 10, wherein at least one of the opposite ends of the bobbin opposite to the magnet has a rounded surface.

13. The shutter device as claimed in claim 10, wherein, in order to open and close the first and the second shutters, the N pole or the S pole of the magnet is located adjacent to one of the opposite ends of the bobbin according to a pivotal direction of the driving arm.

* * * * *